United States Patent [19]
Wargon

[11] Patent Number: 5,949,514
[45] Date of Patent: Sep. 7, 1999

[54] ADHESIVE EYEGLASSES

[76] Inventor: Nicco Wargon, 2251 Hillsboro Ave., Los Angeles, Calif. 90034

[21] Appl. No.: 09/002,450

[22] Filed: Jan. 2, 1998

[51] Int. Cl.[6] .................................................... G02C 1/13
[52] U.S. Cl. .................................. 351/41; 351/44; 351/83
[58] Field of Search .................................. 351/41, 44, 83, 351/86, 154

[56] References Cited

U.S. PATENT DOCUMENTS

| 5,016,999 | 5/1991 | Williams | 351/41 |
| 5,719,655 | 2/1998 | Peschel et al. | 351/41 |

Primary Examiner—Huy Mai
Attorney, Agent, or Firm—Goldstein & Canino

[57] ABSTRACT

Adhesive eyeglasses comprising a frame and a one piece convex shaped lens affixed to the frame such that the lens is spaced away from the face of the wearer. The eyeglasses further comprise a replaceable adhesive strip detachably attached to the frame. The adhesive eyeglasses are secured to the face of the wearer by gently pressing the adhesive strip against the wearer's face. When desired, the adhesive eyeglasses are readily removable from the face of the wearer. Prior to subsequent use, the used adhesive strip can be removed from the frame and replaced with a unused adhesive strip.

5 Claims, 2 Drawing Sheets

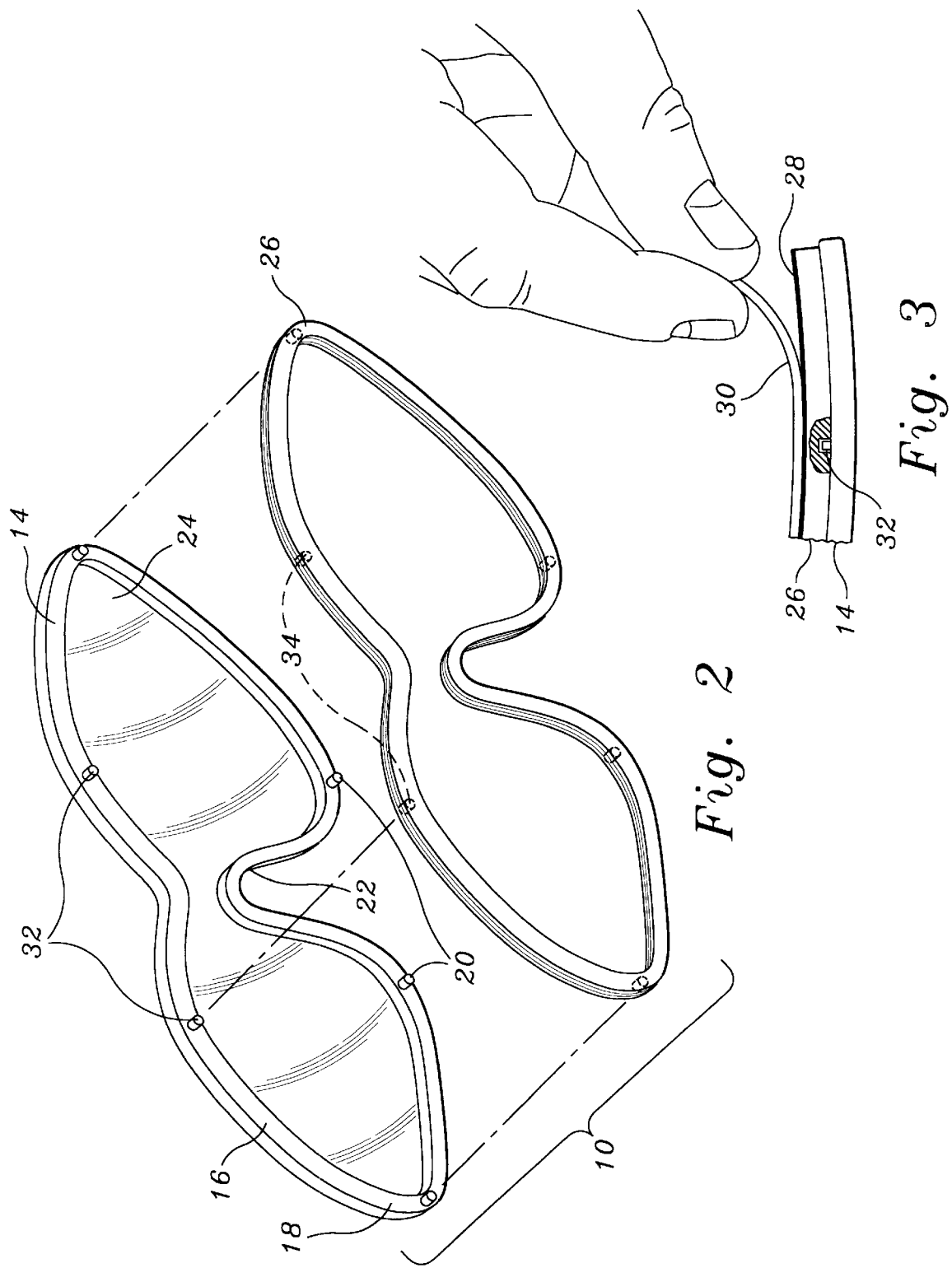

ADHESIVE EYEGLASSES

BACKGROUND OF THE INVENTION

This invention relates to adhesive eyeglasses. More particularly, the invention relates to eyeglasses which employs a frame, a lens affixed to the frame, and a replaceable adhesive strip detachably attached to the frame, designed for securing the frame to the facial skin of the wearer.

Many existing eyeglasses utilize earpieces and a nose pad for supporting the frame of the eyeglasses on the wearer's face. However, when they are worn for long period of time, the earpieces and nose pad of eyeglasses press against behind the ear and bridge of the nose causing major discomfort to those sensitive facial portions. In addition, traditional eyeglasses or sunglasses may not adequately secure the glasses in front of the wearer's face. Especially when the wearer engages in activities that require rapid movement of the body, the sudden movement may cause the glasses to either fall off or move to an improper position. Thus, it is desirable to have a eyeglasses that can be securely attached to the wearer's face without utilizing uncomfortable earpieces and a nose pad.

Accordingly, different types of frameless eyeglasses have been designed to get rid of the discomfort brought by uncomfortable traditional eyeglass frames. For example, U.S. Pat. No. 5,016,999 to Williams discloses frameless safety eyeglasses comprising a right eye lens and a left eye lens. Each lens is peripherally padded with an adhesive coated foam rubber to secure the lens to the face of the wearer. The right and left eye lens are individually secured directly on the wearer's face intended to bring the lens closer to the face so that they are less likely to come in contact with work pieces or the like.

Williams may provide some utility for protecting the eyes of wearer when working in close quarters where there is very little room for eye lenses and frames that project forwardly from the face but is not useful for repeat use since the foam rubber surrounding the eye lens must be manually applied with adhesive material prior to each use. Because the foam rubber padding is permanently attached to the lens, after e each additional use, a new layer of adhesive coating builds up on the foam rubber padding.

Despite the discrete safety eyeglasses, there is still a further need to provide improved adhesive eyeglasses. Such adhesive eyeglasses should utilize a replaceable adhesive strip which can be removed from the frame and replaced by a unused adhesive strip for subsequent uses. Moreover, such adhesive eyeglasses should include one or two piece convex shaped lenses affixed to the frame such that the lenses are spaced away from the face of the wearer.

While these units mentioned above may be suitable for the particular purpose employed, or for general use, they would not be as suitable for the purposes of the present invention as disclosed hereafter.

SUMMARY OF THE INVENTION

It is an object of the invention to provide adhesive eyeglasses which are light in weight, inexpensive to manufacture, and easily worn on wearer's face.

It is another object of the invention to provide adhesive eyeglasses which utilize adhesive to securely attach the frame to the wearer's face, thereby eliminating the necessity of having uncomfortable earpieces and a nose piece.

It is yet another object of the invention to provide adhesive eyeglasses which include a replaceable adhesive strip which can be removed from the frame and replaced by a unused adhesive strip for subsequent uses.

It is a further object of the invention to provide adhesive eyeglasses which include one or two piece convex shaped lenses affixed to the frame such that the lenses are spaced away from the face of the wearer.

The invention is adhesive eyeglasses comprising a frame and a one piece convex shaped lens affixed to the frame such that the lens is spaced away from the face of the wearer. The eyeglasses further comprise a replaceable adhesive strip detachably attached to the frame. The adhesive eyeglasses are secured to the face of the wearer by gently pressing the adhesive strip against the wearer's face. When desired, the adhesive eyeglasses are readily removable from the face of the wearer. Prior to subsequent use, the used adhesive strip can be removed from the frame and replaced with a unused adhesive strip.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is an exploded view of the instant invention with the replaceable strip detached from the frame of the instant invention.

FIG. 3 is a side elevational view of the instant invention illustrating the backing being peeled from the replaceable strip.

DETAILED DESCRIPTION OF THE PREFERRED EMBODIMENTS

Figure 1:
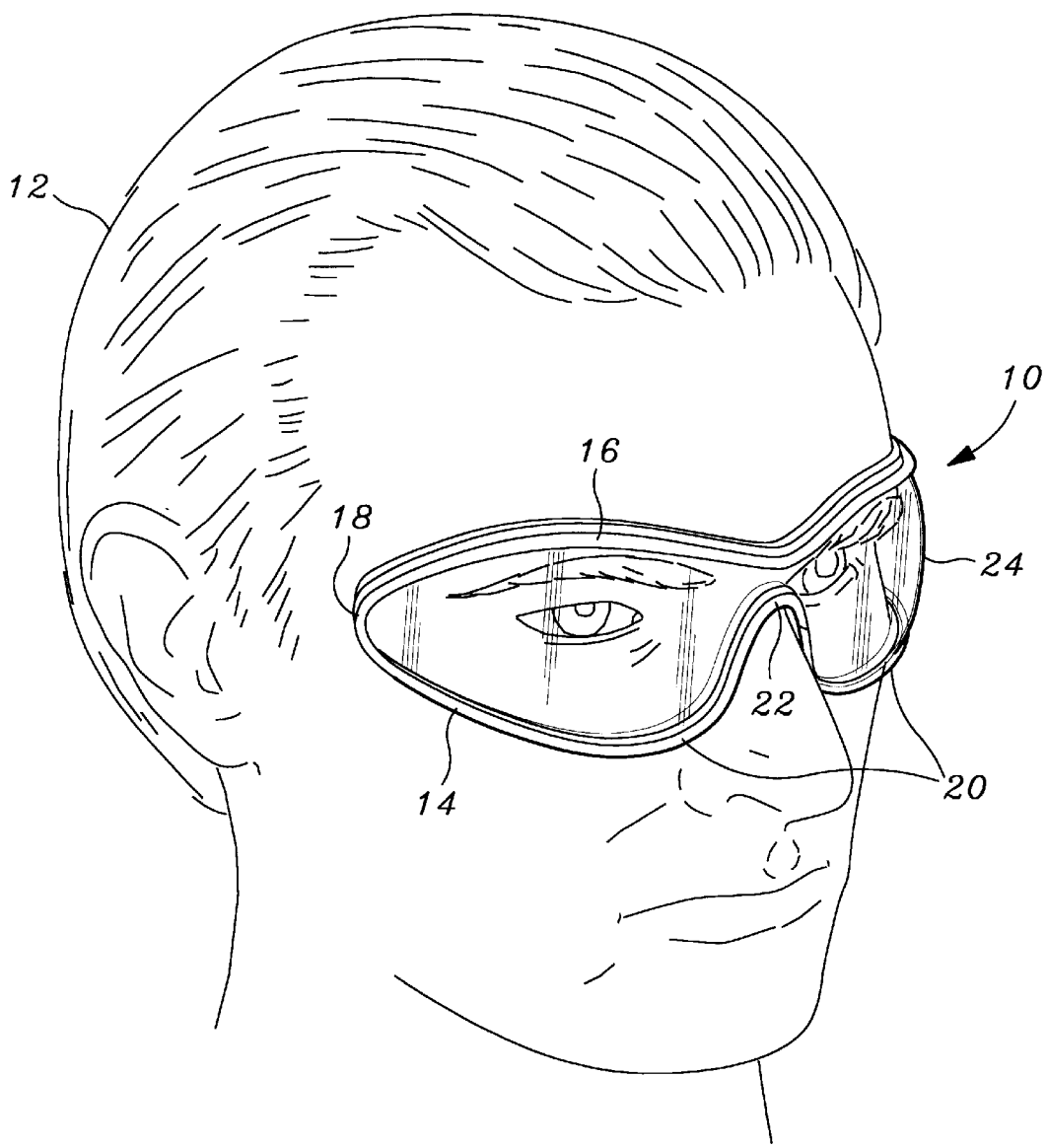
FIG. 1 is a diagrammatic perspective view of the instant invention being worn by a wearer.

FIG. 1 illustrates adhesive eyeglasses 10 being worn by a wearer 12. The adhesive eyeglasses 10 comprise a frame 14 which includes an upper curved portion 16, two side portions 18, two lower curved portions 20, and a nose portion 22. The frame 14 can be constructed of relatively rigid material molded to fit an individual with specific facial structures. Alternatively, the frame 14 may be made of a flexible material so that the frame 14 is capable of readily conforming to the different facial structures of different individuals.

In a preferred embodiment, a one piece convex shaped lens 24 is mounted to the frame 14 so as to provide space between the lens 24 and the face of the wearer 12. The lens 24 may be provided with ventilation holes for evacuating vapor which tends to collect between the face and the adhesive eyeglasses 10. Although FIGS. 1 and 2 illustrate the one piece lens 24 mounted to the frame 14, it should be noted the dimensions and shape of the lens 24 may be modified to suit frames of different style including two piece lenses configurations, which is not shown here.

FIG. 2 illustrates a replaceable strip 26 detached from the frame 14 of the adhesive eyeglasses 10. FIG. 3 illustrates the replaceable strip 26 provided with a coating of adhesive 28 for securing the frame 14 on the wearer's face by adhering the eyeglasses 10 to the facial skin. The replaceable strip 26 further includes a peelable backing 30 for preventing the adhesive 28 from coming into contact with surrounding environment prior to actual use.

One important feature of the present invention is the replaceable strip 26 which can be removed from the frame 14 for replacement by another replaceable strip 26. The frame 14 includes a plurality of pegs 32 protruding horizontally therefrom which cooperate with peg receiving holes 34 provided on the replaceable strip 26 to hold the strip 26 attached, as depicted in FIG. 2. The replaceable strip 26 snaps onto the frame 14 by passing the pegs 32 through the corresponding holes 34 in the replaceable strip 26.

After the replaceable strip 26 is snapped onto the frame 14, the backing 30 is peeled off from the replaceable strip 26 exposing the adhesive 28, as shown in FIG. 3. The adhesive eyeglasses 10 are secured to the face of the wearer 12 by gently pressing the adhesive exposed strip 26 against the wearer's face. When desired, the adhesive eyeglasses 10 are readily removable from the face of the wearer 12. Prior to subsequent use, the used adhesive strip 26 can be removed from the frame 14 and replaced with an unused adhesive strip 26.

While the preferred embodiment of the present invention is disclosed in relation to sunglasses for everyday use, it will be appreciated by those skilled in the art that the adhesive eyeglasses 10 disclosed herein may be utilized in connection with other types of eyeglasses, such as prescription corrective eyeglasses, safety eyeglasses, and the like.

Many specific details contained in the above description merely illustrate some preferred embodiments and should not be construed as a limitation on the scope of the invention. Many other variations are possible.

What is claimed is:

1. Adhesive eyeglasses for wearing on the face of a wearer, comprising:

a) a frame sized and shaped to conform to the facial structure around the eyes of said wearer;

b) a lens mounted to said frame;

c) a replaceable strip releaseably attached to the frame, said replaceable strip includes a coating of adhesive for securing the frame on the face of the wearer.

2. Adhesive eyeglasses for wearing on the face of a wearer, comprising:

a) a frame sized and shaped to conform to the facial structure around the eyes of said wearer, said frame having a plurality of pegs protruding horizontally therefrom;

b) a lens mounted to said frame;

c) a replaceable strip having a plurality of peg receiving holes, said strip releaseably attached to the frame by passing the pegs through the corresponding holes provided in the strip, said replaceable strip includes a coating of adhesive for securing the frame onto the face of the wearer.

3. The adhesive eyeglasses of claim 2, wherein the lens is one piece convex shaped lens affixed to the frame such that the lens is spaced away from the face of the wearer.

4. The adhesive eyeglasses of claim 3, wherein the replaceable strip further comprises a peelable backing for protecting the adhesive coating from coming into contact with surrounding environment prior to actual use.

5. The adhesive eyeglasses of claim 4, wherein the lens is selected from the group consisting of sunglasses lens, a prescription corrective lens, and a safety lens.

* * * * *